3,274,643
APPARATUS FOR DETERMINING THE EXPANSIVE PRESSURE OF MOLDED POLYSTYRENE BEADS
Berton R. Oxel, New Castle, Pa., assignor to Dyfoam Corporation, New Castle, Pa., a corporation of Pennsylvania
Filed July 20, 1964, Ser. No. 383,822
3 Claims. (Cl. 18—4)

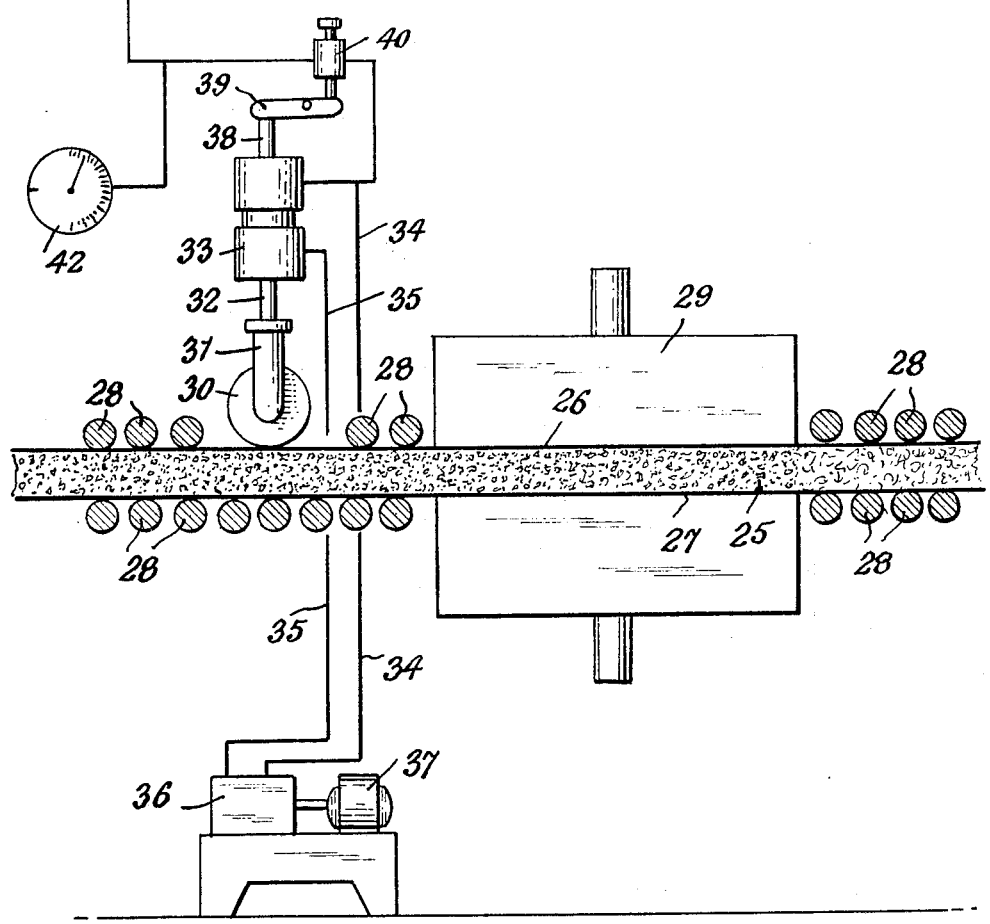

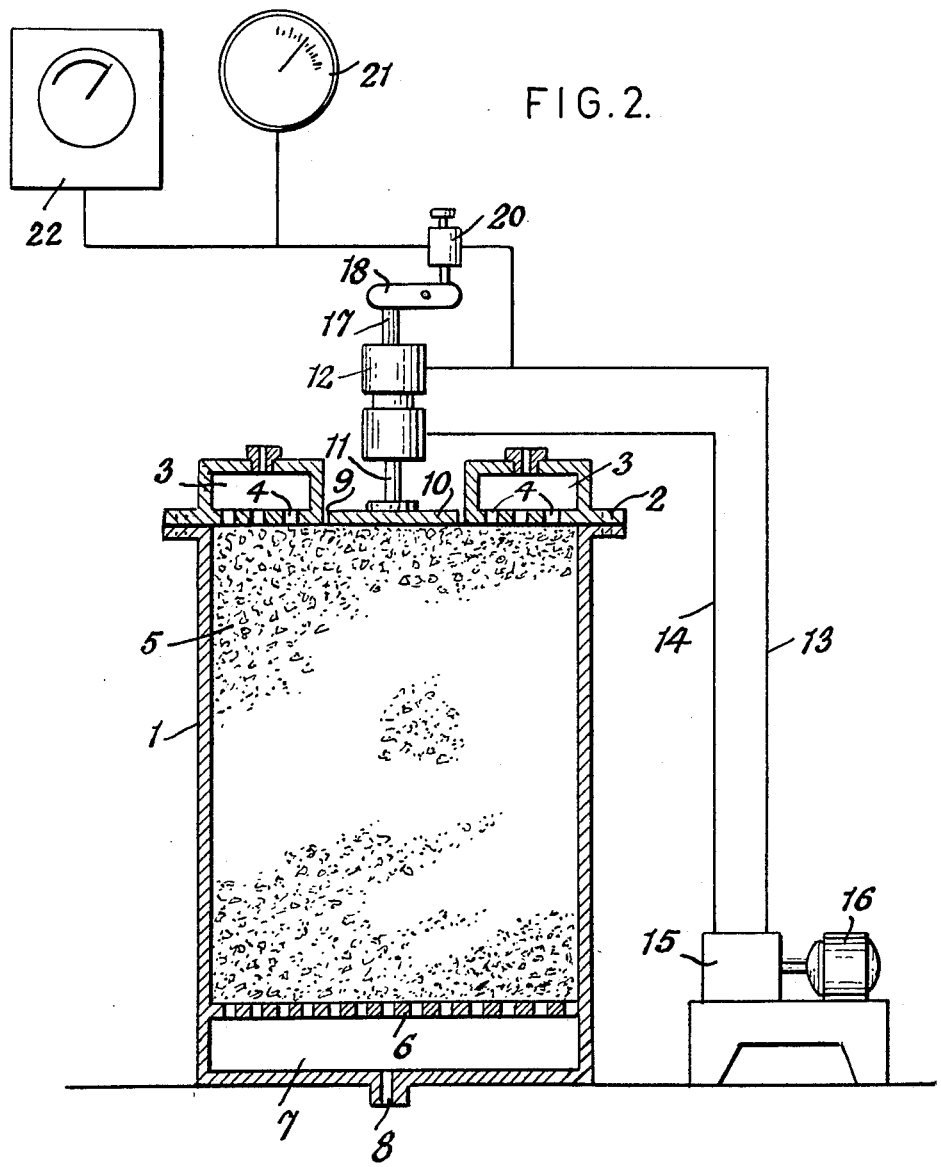

This invention relates to apparatus for molding polystyrene and more particularly to means by which the expansion characteristics of the polystyrene beads can be checked and regulated.

It is an object of the invention to provide an indicating or recording device by which the expansion pressure of the beads will be disclosed to indicate that such pressure is correct for the securement of a first-class slab, block or other molded product. It is notable that due to numerous causes such as, for example, a low or high amount of blowing agent used in the batch, low or high expansion will occur, and in the case of insufficient blowing agent, bead fusion will take place. Improper temperature, too-fast feeding of the product into the molds in continuous molding, and other factors result in too little or too great expansion of the beads, resulting in a poor product.

It is therefore highly desirable that the expansion characteristics of each batch of material be maintained at the level at which best results and a fine product are secured, and this is an important object of the present invention and which provides a means by which any deviation from the desired expansion in the product can be at once ascertained and corrected accordingly.

With these and other objects to be hereinafter set forth in view, I have devised the arrangement of parts to be described and more particularly pointed out in the claims appended hereto.

In the accompanying drawings, wherein illustrative embodiments of the invention are shown, FIG. 1 shows diagrammatically one embodiment of the invention, and FIG. 2 shows another embodiment.

In the embodiment of the invention shown in FIG. 2, a closed or so-called "batch" mold is indicated at 1, the same containing the expandable polystyrene beads which are being molded into a body according to the shape of the mold. The mold is closed at the top by a fastened-down cover 2 provided with a steam jacket 3 into which steam is supplied to pass through the perforations 4 in the cover 2 to reach and cause the expansion of the polystyrene beads 5 contained in the mold.

The mold is provided with a perforated false bottom 6 through which the steam and water can pass to enter the lower chamber 7 of the mold and pass out of the outlet 8.

The central part of the cover 2 of the mold is apertured as shown at 9 and entering said aperture is a platen 10 connected to one end of a piston rod 11 having its opposite end attached to a piston contained within a cylinder, said cylinder being indicated at 12. Said piston is maintained centrally or in a specific position within the cylinder 12 by means of hydraulic pressure imposed on the opposite sides of the piston from piping 13, 14 respectively leading from a pump 15 powered by a motor 16.

At 17 is shown a stem extending from the piston in the cylinder 12, said stem being connected to a pivoted lever 18 that is operative on a pressure indicator 20 connected to a gauge 21 and/or to a recorder 22.

When the expandable polystyrene is steamed in the mold 1 and reaches the final expansion and formation of a molded block or piece, the expansion and formation of the rigid block takes place. The expansion pressure from the beads presses against the platen 11 which pressure acts against the piston in the cylinder 12 and any movement of said piston will be transmitted through pressure indicator 20 to the gauge 21 and/or recorder 22. This arrangement will not only show the pressure produced by the expansion of the beads, but will also show any variation in pressure during the molding operation.

By reason of the obtaining of information as to the pressure obtained by the extent of expansion of the beads, it is possible to make any necessary changes in steam pressure, amount of beads placed in a mold of given capacity, or to make any other changes in order to secure the best finished product.

In the embodiment shown in FIG. 1, the invention is shown as applied to a continuous method of manufacturing slabs of the expanded polystyrene material. In this arrangement the polystyrene material 25 is fed from a hopper (not shown) by feeding means which delivers it between movable perforated metallic bands 26 and 27 backed by rollers 28 and by side bands so that the formation of a continuous slab takes place between the bands. The slab is subsequently cut into desired lengths and widths. In its movement toward the left as viewed in FIG. 2, the material passes through a steam chest 29 wherein it expands and forms the final slab, and the expansion pressure occurs.

Directly beyond the steam chest 29 is a vertically movable and rotatable roller 30 carried by a clevis 31 formed on a stem 32 that is connected to a piston contained in the cylinder 33. The roller 30 rests upon the top of the upper band 26. The piston is held centrally or in a predetermined position in the cylinder by means of hydraulic pressure delivered into the cylinder at opposite sides of the piston by pipes 34 and 35 leading from a pump 36 powered by the motor 37.

The piston in the cylinder 33 has a projecting stem 38 connected to a pivoted lever 39 which actuates a pressure indicator 40 connected to a recorder and/or gauge 41.

When the expansion pressure from the beads located between the bands 26 and 27 takes place the upper band 26 will be urged against the roller 30 which will be elevated to move the piston in the cylinder 33, with such movement transmitted through the hydraulic fluid in the cylinder and indicated on the gauge 42 and/or recorder 41. This information makes it possible to regulate the steam pressure or temperature imposed on the beads; to increase or decrease the band speed or to regulate the amount of beads fed between the bands in order to secure the best results.

When the heat from the steam chamber contacts with the beads, passing through the perforations in the bands 26 and 27, the beads start to expand and fill the voids between them and start to form the body. If the beads contain too much blowing agent, a high expansion results. On the other hand, if the beads do not contain sufficient blowing agent, too low an expansion results, causing bead fusion. These results will be shown on the gauge 42 or pressure recorder 41 and changes and corrections can be made immediately, to prevent undesirable results.

It will be apparent from the foregoing that means is provided by which the expansion pressure produced in the molding of the polystyrene beads in either batch molding or continuous molding, can be readily ascertained, thus assuring the production of a uniform, completely satisfactory product.

In the manufacture of some polystyrene blocks or slabs a certain amount of so-called "scrap" beads are mixed with fresh, expanded beads, and particularly in a continuous molding machine as described in connection with FIG. 1. By the determination of expansive pressure through the use of the herein-described apparatus, the proportion of scrap to the fresh expanded beads can be increased automatically if desired if the expansion pressure increases or drops over or under predetermined limits. It is also possible to automatically regulate the temperature imposed on the beads; to regulate the rapidity of feed of the material; to control or regulate the proportions in the mixture or to release the molded foam from its mold according to the showings or disclosures of the indicating or recording means 21, 22, 41 and 42.

Having thus described an embodiment of the invention, it is obvious that the same is not to be restricted thereto but is broad enough to cover all structures coming within the scope of the annexed claims.

What I claim is:

1. In an apparatus for the molding of plastic from the expansion of polystyrene beads, the combination comprising a pair of moving endless bands between which said beads are expanded and molded, said bands being supported and motivated by a plurality of spaced rollers; a steam chest positioned along the path of said bands and through which said bands and said beads travel to cause the expansion of said beads; the improvement comprising the replacing of one of said spaced supporting and motivating rollers immediately adjacent the discharge end of said steam cabinet by a motion indicating means, said means being in direct contact with said band so as to be responsive to, and to be able to transmit, any relative movement of said bands caused by the expansion of said beads.

2. The apparatus as defined in claim 1 wherein said motion indicating means comprises a roller, said roller being connected with means which will keep said roller in direct contact with said band.

3. The apparatus as defined in claim 2 wherein said means to keep said roller in contact with said band comprises an hydraulic cylinder, said hydraulic cylinder having a piston with a stem at each end thereof, one of said stems being connected to said motion responsive roller and the other of said stems being connected to recording and gauge means to visually indicate the relative movement of said bands caused by the expansion of said beads.

References Cited by the Examiner

UNITED STATES PATENTS

| | | | |
|---|---|---|---|
| 2,423,914 | 7/1947 | Wacker | 18—30 |
| 2,566,854 | 9/1951 | Rhodes. | |
| 2,929,793 | 3/1960 | Hirsh | 18—4 X |
| 2,954,589 | 10/1960 | Brown. | |
| 2,998,501 | 8/1961 | Edberg et al. | 18—4 X |
| 3,015,851 | 1/1962 | Wiles | 18—5 X |
| 3,025,568 | 3/1962 | Hardy | 18—30 |
| 3,042,973 | 7/1962 | Brockhues et al. | 18—5 X |
| 3,065,500 | 11/1962 | Berner | 18—4 |
| 3,079,661 | 5/1963 | Lamb | 18—21 |
| 3,131,426 | 5/1964 | Legler | 18—5 |

OTHER REFERENCES

"Pressure Gage for Injection Molding," Modern Plastics, April 1953, pages 109, 110 and 112.

WILLIAM J. STEPHENSON, *Primary Examiner.*